Patented Oct. 17, 1922.

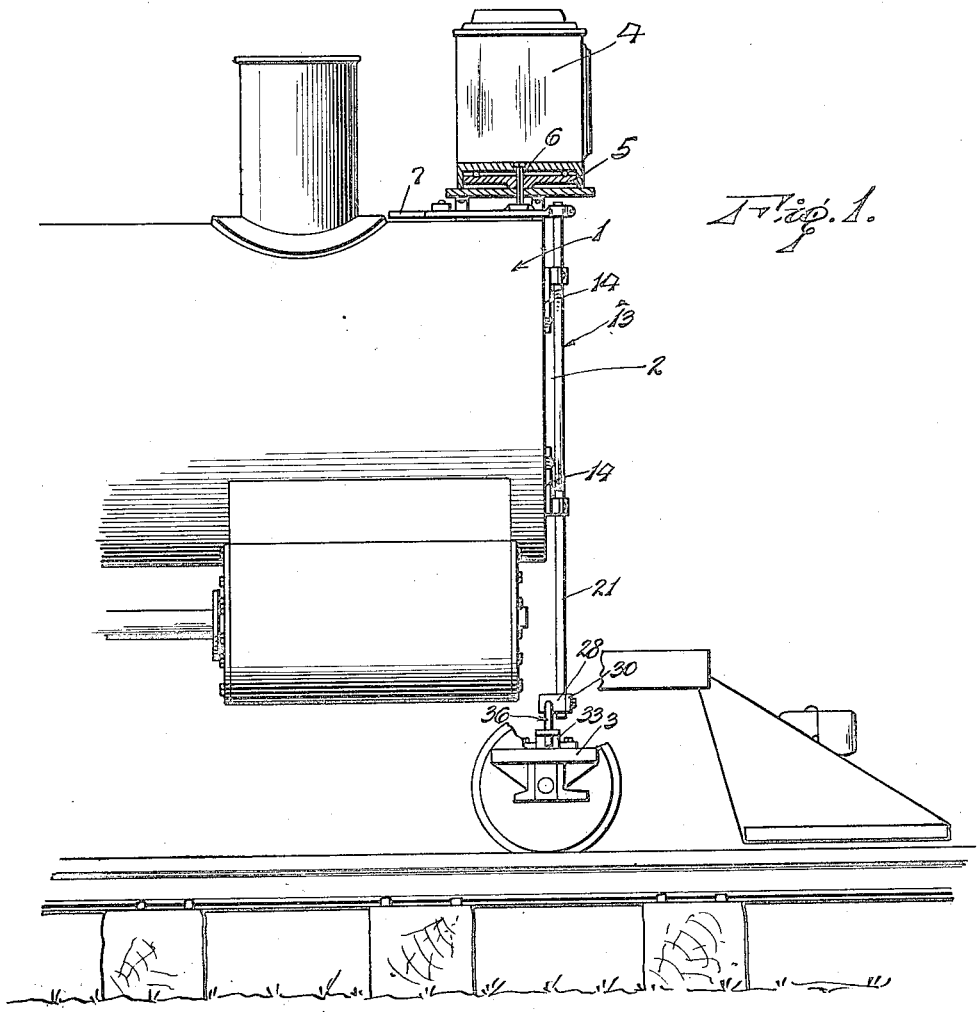

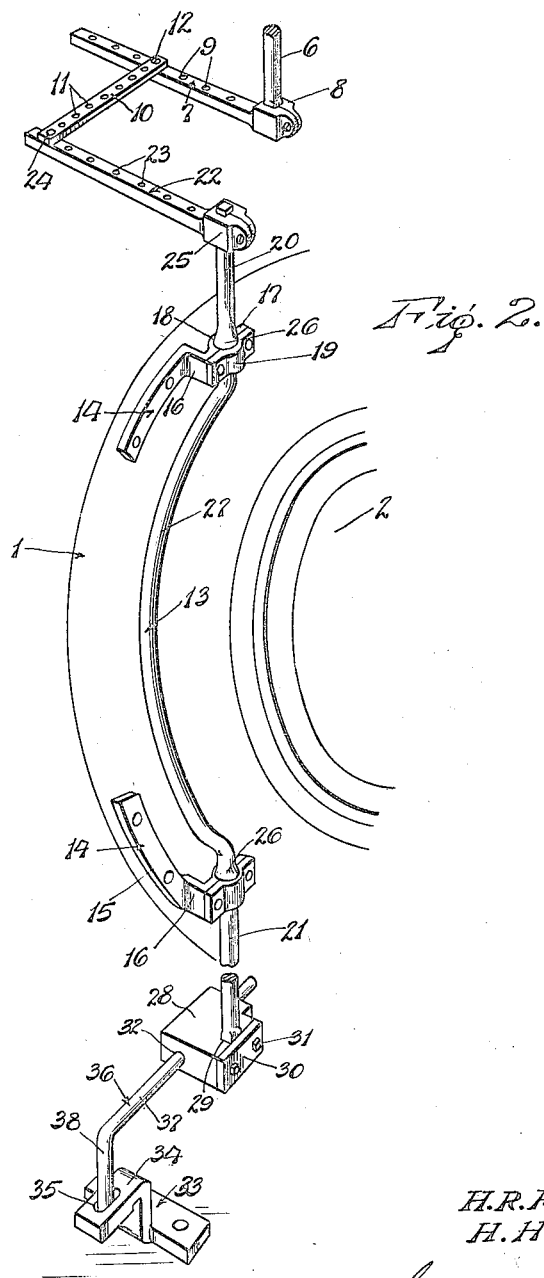

1,432,172

UNITED STATES PATENT OFFICE.

HARRY R. FITZGERALD AND HARRY H. WALTON, OF MEMPHIS, TENNESSEE.

LOCOMOTIVE-HEADLIGHT CONTROL.

Application filed May 26, 1921. Serial No. 472,715.

*To all whom it may concern:*

Be it known that we, HARRY R. FITZGERALD and HARRY H. WALTON, citizens of the United States, residing at Memphis, in the county of Shelby and State of Tennessee, have invented certain new and useful Improvements in Locomotive-Headlight Controls, of which the following is a specification.

This invention relates to head light controls for locomotives and is designed more particularly as an improvement on the structure shown in our patent No. 1,333,205, issued March 9, 1920.

One of the objects of the present invention is to provide means for controlling the head light so as to turn the same to direct the beam of light at all times in the line of travel and regardless of the side rock or side movement of the pony truck of the locomotive upon which the control is mounted, the control mechanism being so constructed in the present improvement, that side movement of the pony truck with relation to the upper structure of the locomotive will not subject the parts of the control to severe strains nor occasion irregular and jerky movement of the head light.

Another object of the invention is to so construct the control device as to adapt the invention for application to locomotives provided with smoke box doors in the forward ends of their boiler shells, so that the presence of the device will not interfere with the opening of said door for the purpose of inspection or repairs.

In the accompanying drawings:

Figure 1 is a side elevation of the control embodying the invention installed upon a locomotive;

Figure 2 is a perspective view of the control mechanism.

In the drawings, the numeral 1 indicates the boiler shell of a locomotive of a well-known type and provided at its front with the usual smoke box door indicated by the numeral 2, the numeral 3 indicates the pony truck of the locomotive, and the numeral 4 indicates the locomotive head light which is mounted and controlled in a manner which will now be described.

The head light 4 is supported for swiveling movement upon a base 5 which, inasmuch as it is fully disclosed in our above mentioned patent, need not be further herein described. However, a stem extends downwardly from the bottom of the head light 4 and is connected with the said head light, and the control device embodying the present invention is designed to act upon this stem to suitably turn the head light and maintain its rays directed in the line of travel. In the improved structure the head light 4 is mounted above the forward end of the boiler shell 1, and an arm 7 extends rearwardly from the lower end of the stem 6 and comprises a split collar portion 8 which is clamped to the said lower end of the stem, and thus supports the arm proper, the said arm being provided throughout its length with a series of openings indicated by the numeral 9. The numeral 10 indicates a connecting bar which is provided with a series of openings 11, and a pivot bolt 12 is fitted through the openings 9 and 11 in the arm 7 and bar 10 so as to pivotally connect these parts, it being understood that the amplitude of movement of the arm 7 for any given distance of movement of the bar 10 may be varied by varying the location of the point of pivotal connection 12.

The control device includes a rocker which is indicated in general by the numeral 13 and which is mounted upon the front of the locomotive boiler shell 1. In mounting this rocker, brackets 14 are employed and each of these brackets comprises an attaching portion 15 which is preferably of the arcuate form shown in Figure 2 and which is riveted or otherwise secured to the front of the boiler shell near the circumference thereof, these attaching portions, being of the arcuate form shown, not interfering in any way with the smoke box door 2. Each bracket further includes a short arm 16 which projects from one end of the attaching portion 15 and is thence deflected laterally as at 17 and formed to provide one-half of a bearing sleeve 18, the bearing being completed by a cap member 19 bolted to the said lateral portion 17. The brackets 14 are arranged one above the other and their bearings rotatably receive the upper and lower stems of the rocker 13 which stems are indicated respectively by the numerals 20 and 21. An arm 22 is provided with a longitudinal series of openings 23 whereby variable pivotal connection may be established between it and the other end of the bar 10 through the medium of a pivot bolt 24, and this arm 22 is provided at its forward end with a split collar 25 which is clamped to the upper end of the stem 20 of the rocker 13. Above the upper bearing bracket 14 and below the lower one of the said brackets, the rocker 13 is provided with enlargements or shoulder portions 26, and between these brackets is laterally bowed on the arc of a circle as indicated by the numeral 27 so as to clear the periphery of the smoke box door 22 and thus permit of opening and closing of the door without interference on the part of head light control mechanism. It will be evident at this point that notwithstanding the peculiar formation of the intermediate portion of the rocker 13, that is to say the portion thereof which lies between the brackets 14, the rocker may have free turning movement in its bearings 14, and when it is rocked in one direction or the other, the arm 22 will be correspondingly swung and like swinging movement will be imparted to the arm 7 thereby effecting turning movement of the stem 6 and the head light 4 with which the stem is connected.

In order that turning movement may be imparted to the rocker 13 in consonance with the turning of the pony truck 3, a head 28 is provided in one face with a socket 29 to receive the squared lower end of the stem 21 of the rocker, and a cap plate 30 is secured as for example by bolts 31 to this face of the head and closes the said socket and clamps the head to the said end of the stem. The head 28 is provided with a transversely extending bore 32, the line of extent of the bore being at right angles to the line of extent of the stem 21. A bracket 33 is fixed in any suitable manner upon the pony truck 3 at any convenient portion thereof and is provided with a laterally directed arm 34 formed with a slightly elongated opening 35. The numeral 36 indicates in general a connection which is provided between the head 28 and the arm 34, and this connection includes an arm 37 and an arm 38, the arms extending at right angles with relation to each other and the arm 37 being fitted slidably through the bore 32 and the arm 38 fitting loosely within the opening 35. It will now be evident that any side rock of the pony truck 3 will not in any way affect or disturb the connection 36 due to the elongation of the opening 35 and the free play of the arm 38 therein. Likewise direct lateral displacement of the pony truck will not affect or disturb this arm except to slide the same back and forth through the bore 32. However, upon turning movement of the truck 3, in rounding a curved stretch of track, the member 36 will be so moved as to rock or turn the head 28 and impart rocking movement to the rocker 13 and, through the connections previously described, to the head light 4 so as to maintain the beam from this headlight directed in the line of travel.

Having thus described the invention, what is claimed as new is:

1. In head light control mechanism for locomotives, bearing members attachable to the front of a locomotive boiler shell and to one side of the smoke box door, a rocker comprising upper and lower stems revolubly fitting in the bearings, means attached to said upper stem for connection with the head light to control the same, a head rigidly secured on said lower stem and provided with a lateral bore, a member slidably mounted in said bore, a depending arm on said member and a bracket rigidly secured on the locomotive truck having a laterally elongated opening engaging loosely with said depending arm.

2. In a locomotive head light control, a rocker, means for operative connection between the rocker and the head light to be controlled, the rocker including a lower stem, a head fixed thereto, a bracket member for attachment to the locomotive truck, and a connection between the bracket member and head slidably engaging the latter and having free play with the former, said connection including a slidable member having a depending arm, a lateral bore being provided for said member in said head and said bracket having a laterally elongated opening loosely engaging said arm.

In testimony whereof we affix our signatures.

HARRY R. FITZGERALD. [L. S.]
HARRY H. WALTON. [L. S.]